United States Patent [19]
Stolzer

[11] 3,895,723
[45] July 22, 1975

[54] APPARATUS FOR FEEDING ROD-SHAPED STOCK

[75] Inventor: Paul Stolzer, Achern, Germany

[73] Assignee: Keuro Maschinenbau Gesellschaft mit beschränkter Haftung & Co., Achern, Germany

[22] Filed: Sept. 10, 1974

[21] Appl. No.: 505,030

[30] Foreign Application Priority Data
Sept. 14, 1973 Germany............................ 7333342

[52] U.S. Cl................. 214/1 P; 198/20 R; 198/107
[51] Int. Cl.²......................................... B65G 37/00
[58] Field of Search......... 214/1 R, 1 P, 1 PB, 91 R, 214/89; 198/20 R, 106, 107, 94

[56] References Cited
UNITED STATES PATENTS
| | | | |
|---|---|---|---|
| 863,841 | 8/1907 | George............................ | 198/107 X |
| 3,823,812 | 7/1974 | Sicurin............................ | 214/1 P X |

*Primary Examiner*—Frank E. Werner
*Attorney, Agent, or Firm*—Spencer & Kaye

[57] ABSTRACT

An apparatus for automatically feeding rod-shaped stock to a programmer-controlled cutting machine has a conveyor leading to the cutting machine, a frame structure that defines a compartment series extending transversely to the conveying path of the conveyor. Each compartment accommodates stock of a particular cross section and/or quality. The frame structure is movable in a programmed manner transversely to the conveying path for aligning a selected one of the compartments with an input zone of the conveyor. There is further provided a program-controlled mechanism that vertically moves the frame for lifting it away from and lowering it into the input zone at the beginning and at the end, respectively, of the transversal movement of the frame structure. By lowering the frame, the stock in the compartment aligned with the input zone is transferred from the compartment to the conveyor.

11 Claims, 2 Drawing Figures

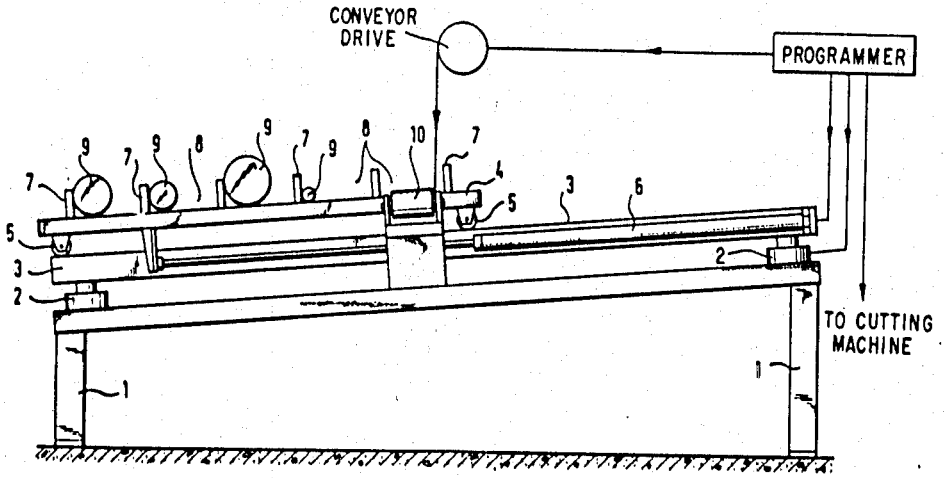

APPARATUS FOR FEEDING ROD-SHAPED STOCK

BACKGROUND OF THE INVENTION

The invention relates to an apparatus for the automatic supply of a cutting machine with stock in rod form. The cutting machine has a programmed control system into which data are fed which relate to the desired number of pieces and lengths of the parts to be cut off and, according to the requirements in each case, cutting pressure and cutting speed for a subsequently occurring automatic course of work. Further, the stock is fed to the cutting machine by way of a conveyor track which can be driven in both directions and which is oriented perpendicularly to the cutting plane of the cutting tool. The conveyor track extends from the stock clamping means of the cutting machine to a station where the stock is loaded on the conveyor track and where the returning residual material is removed. The stock of one particular material and cross section is located in a storage compartment parallel with the conveying track.

Cutting machines in this environment may include circular saws, band saws, frame saws, flame cutting machines, and the like. The program-controlled cutting machines which work automatically in a known manner are advantageous in that after insertion of a rod-shaped stock and input of an appropriate work program, without further assistance a number of pieces may be severed from the stock. This number is as large as desired according to the storage capacity of the program control system. If, however, the inserted rod is consumed, whereas the program is not yet ended, a new rod must be inserted. If, on the other hand, the program is terminated before the consumption of a rod, the residue must be returned for storage, a rod of the successive type to be worked on must be inserted and a new program is to be initiated. These tasks require the constant activity of at least one operator, so that despite the extensively automatic manner of operation of the cutting machine, there is a relatively high wage cost involved.

An apparatus of the above-outlined type which is known from German Laid Open application (Offenlegungsschrift) No. 2,163,101 solves these problems as well as those relating to the storing of material. For this purpose in the known apparatus the material is accommodated on pallets which are brought, according to requirements, to the conveying track and from which the material is subsequently taken and deposited on the conveying track. Thus, a completely automatically working plant is provided which can be programmed for days in advance and then works completely automatically, so that it is only necessary to refill the empty pallets with stock and to forward the severed parts to their further destination.

This known installation, however, has to be of considerable size due to the operations it is required to perform. Thus, in view of the space requirements involved and the purchase costs, such apparatus is profitable only for relatively large plants where the cutting machine is intensively utilized and where a great variety of rod stock has to be stored. Thus, where an installation of the known kind is not economical, the stated problems still remain.

SUMMARY OF THE INVENTION

It is an object of the invention to provide an improved apparatus of the above-outlined type which - although it may be of the small capacity type - makes possible an automatic operation of a cutting machine for a prolonged period without the need for an operator. Accordingly, the apparatus should be spacesaving, so that without difficulty it can even be accommodated in the vicinity of an already existing cutting machine. Further, the apparatus should be simple in construction and thus economical as regards purchase costs and also should be operationally reliable.

These objects and others to become apparent as the specification progresses, are accomplished by the invention, according to which, briefly stated, the apparatus for automatically feeding rod-shaped stock to a programmer-controlled cutting machine has a conveyor leading to the cutting machine, a frame structure that defines a compartment series extending transversely to the conveying path of the conveyor. Each compartment accommodates stock of a particular cross section and/or quality. The frame structure is movable in a programmed manner transversely to the conveying path for aligning a selected one of the compartments with an input zone of the conveyor. There is further provided a program-controlled mechanism that vertically moves the frame for lifting it away from and lowering it into the input zone at the beginning and at the end, respectively, of the transversal movement of the frame structure. By lowering the frame, the stock in the compartment aligned with the input zone is transferred from the compartment to the conveyor.

These measures provide a simple auxiliary apparatus for cutting machines. In the storage compartments of the auxiliary apparatus different rod stock can be placed and subsequently, the cutting machine, after appropriate programming, can start its operation and can be supplied with stock over a relatively extended period of time, for example one day, without the need for the attendance of an operator.

The known conveying track, which normally is formed as a roller track, is incorporated in the invention, inasmuch as in addition to its conveying function, it also takes over the task of lifting the rod stock out of the storage compartments and redepositing it thereinto.

BRIEF DESCRIPTION OF THE DRAWINGS

FIG. 1 is a schematic side elevational view of a preferred embodiment of the invention viewed from the side of an associated cutting machine.

FIG. 2 is an enlarged side elevational view of a detail of the apparatus according to FIG. 1.

DESCRIPTION OF THE PREFERRED EMBODIMENTS

Turning now to FIG. 1, there are provided a plurality of horizontally spaced rails 3 (only one shown) which are substantially vertically displaceable as a unit on a stand 1 by means of power cylinder assemblies 2. A frame 4 is movably mounted on the rails 3 by means of rollers 5. For causing travel of the frame 4 on the rails 3, there is provided a power cylinder assembly 6, which is arranged between the rails 3 and the piston rod of which is connected to the frame 4.

On the frame 4 which is made of several, horizontally spaced section beams or the like, there are provided partitions 7, each extending normal to the plane of the drawing and also serving for interconnecting the section beams of the frame 4. Five juxtaposed storage compartments 8 which can hold rod stock 9 of different diameter ready for supplying a cutting machine (not shown), are formed by the partitions 7 and constitute a compartment series. The connection between the apparatus as illustrated in FIG. 1 and the cutting machine is provided by a roller track 10 which may be driven in both directions by a program-controlled conveyor drive. The conveyor 10 extends perpendicularly to the plane of the drawing over the entire length of the frame 4 and has its discharge zone at the cutting machine. The conveyor 10 further has an input zone which is crossed by the frame 4. As it may be observed from FIG. 1, the series of the compartments 8 is oriented in a direction that is normal to the conveying path of the conveyor 10. The roll-way 10 is interrupted beneath the section beams forming the frame 4 and can protrude so far into the individual storage compartments 8 that it is able to lift the respective rod 9 off the section beams of the frame 4.

In case of a frame 4 of substantial length that runs on several rails 3, in order to maintain small the number of the power cylinder assemblies 2, the rails 3 are interconnected by means of web members extending parallel to the conveying path of the conveyor 10. In this manner the rails 3 form a rail bridge.

In the description that follows, the operation of the above-described apparatus associated with a programmed cutting machine will be set forth.

It is assumed that the cutting machine is programmed for five "orders," according to which a specific number of pieces of specific lengths are to be cut from rod stock of different cross sections and material. According to the sequence of these "orders," the storage compartments 8 are filled from right to left, as viewed in FIG. 1, with the different rods 9 required for each "order."

Thereupon, for the completion of the first "order," the rod 9 situated in the right-hand storage compartment 8 is fed by means of the conveying track 10 to the cutting machine for comminution. After the cutting machine has severed the desired number of pieces from that rod, the remainder of that rod stock is brought back by the conveying track 10 into the right-hand storage compartment 8. In the path of the returning rod stock there may be arranged a sensor, such as two light barriers, which ejects those rod residues whose length is shorter than the interval of the light barriers and thus storage of such remaining rod portions is not worthwhile.

Subsequently, expediently on command by the program controlling the cutting machine, the rails 3 are lifted by the power cylinders 2 so far that the frame 4 clears the conveying track 10 and can be driven further to the right by one compartment 8 by means of the power cylinder 6 which is also programcontrolled. Thereafter, the rails 3 and the frame 4 are again lowered by means of the power cylinders 2, whereby the conveying track 10 enters from beneath the compartment now disposed thereabove and during this occurrence the conveying track 10 lifts the rod 9 situated in that compartment off the section beams of the frame 4, in order to advance the rod to the cutting machine.

The power cylinder assemblies 2 and 6 may be associated with conventional hydraulic circuits the valves and/or pressure generating means of which are coupled to a programmer for automatically controlling the energization of the assemblies 2 and 6.

In order to ensure that the stock contained in each of the compartments 8 can be positioned accurately in relation to the conveying track 10, the entire apparatus, thus including the series of the compartments 8, is placed obliquely transversely of the conveying track 10, as may be seen from FIG. 1, so that in each compartment the rod 9 is supported on the lower partition 7 defining that particular compartment 8. Furthermore, for the same purpose, as may be seen from FIG. 2, to each compartment there may be assigned a stop 11 which is attached to the frame 4 and which, after the lowering of the frame 4, can be moved against a stop 12 of the conveying track 10 by an automatic, repeated actuation of the power cylinder assembly 6.

For the control of the arrangement there may be used known relay sequence control systems. To adapt them to different numbers, lengths or diameters of the workpieces there may be used additional program cards. Reference is given to the production line of KEURO Maschinenbau, Achern/Deutschland and to German Laid Open application No. 2 163 101 resp. U.S. Pat. No. 3 810 404

It will be understood that the above description of the present invention is susceptible to various modifications, changes and adaptations, and the same are intended to be comprehended within the meaning and range of equivalents of the appended claims.

I claim:

1. An apparatus for automatically feeding rod-shaped stock to a cutting machine that is controlled by a programmer, comprising in combination:
   a. a conveyor for transporting rod-shaped stock, said conveyor having an input zone in which the conveyor receives the stock, a conveying path along which the conveyor advances the stock to the cutting machine and a discharge zone in which the stock is introduced from the conveyor into the cutting machine;
   b. frame means defining a series of juxtaposed compartments for accommodating the rod-shaped stock in an orientation parallel to said conveying path, said series extending transversely to said conveying path and crossing the same in said input zone of said conveyor;
   c. first power means for moving said frame means transversely to said conveying path for aligning a selected one of said compartments with said conveyor; said first power means being controlled by said programmer; and
   d. second power means for raising said frame means from a lowered position clear of said conveyor prior to moving said frame means by said first power means and for lowering said frame means for bringing said selected compartment into said input zone of said conveyor for lifting, by said conveyor, the rod-shaped stock in said selected compartment off said frame means for transportation along said conveying path; said second power means being controlled by said programmer.

2. An apparatus as defined in claim 1, including a reversible conveyor drive means moving said conveyor and controlled by said programmer for transporting remaining portions of the stock from the cutting machine to one of said compartments.

3. An apparatus as defined in claim 1, wherein at least one of said power means includes a power cylinder assembly.

4. An apparatus as defined in claim 1, wherein each said compartment is open at the top and has a bottom opening; said conveyor having discontinuities in said input zone for accommodating portions of said frame means when said frame means is in its said lowered position.

5. An apparatus as defined in claim 1, said series of compartments being oriented at an inclination to the horizontal.

6. An apparatus as defined in claim 1, further comprising a stand; rail means mounted on and supported by said stand, said rail means extending transversely to said conveying path and crossing the same under said input zone of said conveyor; and means for mounting said frame means on said rail means.

7. An apparatus as defined in claim 6, said rail means being formed of a plurality of horizontally spaced rails and webs extending parallel to said conveying path and interconnecting said rails whereby said rail means constitutes a rail bridge.

8. An apparatus as defined in claim 6, further comprising first stops attached to said frame means, each said first stop being located in the zone of a separate one of said compartments and a second stop connected to said conveyor, each said first stop cooperating with said second stop for aligning said compartments with said input zone of said conveyor.

9. An apparatus as defined in claim 6, wherein said second power means is disposed between and is in contact with said rail means and said stand for substantially vertically moving said rail means and said frame means as a unit with respect to said stand.

10. An apparatus as defined in claim 9, said first power means being mounted on said rail means and being attached to said frame means.

11. An apparatus as defined in claim 10, wherein said rail means includes a plurality of parallel, horizontally spaced rails, said first power means being disposed between two of said rails.

* * * * *

UNITED STATES PATENT OFFICE
CERTIFICATE OF CORRECTION

PATENT NO. : 3,895,723
DATED : July 22nd, 1975
INVENTOR(S) : Paul Stolzer

It is certified that error appears in the above—identified patent and that said Letters Patent are hereby corrected as shown below:

Add Figure 2 to the drawings as shown on the attached sheet.

Column 2, line 8, change "spacesaving" to --space-saving--.

Column 3, line 60, change "programcontrolled" to --program-controlled--.

UNITED STATES PATENT OFFICE
CERTIFICATE OF CORRECTION

Patent No. 3,895,723　　　　　　　　　Dated July 22, 1975

Inventor(s)　Paul Stolzer　　　　　　　　PAGE - 2 -

It is certified that error appears in the above-identified patent and that said Letters Patent are hereby corrected as shown below:

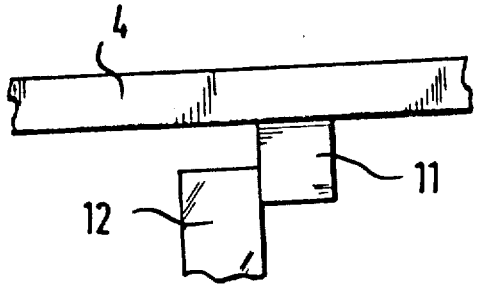

Fig.2

Signed and Sealed this sixteenth Day of December 1975

[SEAL]

Attest:

RUTH C. MASON
Attesting Officer

C. MARSHALL DANN
Commissioner of Patents and Trademarks